(12) United States Patent
Mei et al.

(10) Patent No.: US 7,759,019 B2
(45) Date of Patent: Jul. 20, 2010

(54) LIQUID FUEL CELL, MEMBRANE ELECTRODE ASSEMBLY AND CATHODE

(75) Inventors: Wu Mei, Yokohama (JP); Miho Maruyama, Yokohama (JP); Jun Tamura, Yokohama (JP); Yoshihiro Akasaka, Kawasaki (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1142 days.

(21) Appl. No.: 11/370,852

(22) Filed: Mar. 9, 2006

(65) Prior Publication Data

US 2006/0204832 A1 Sep. 14, 2006

(30) Foreign Application Priority Data

Mar. 11, 2005 (JP) ............... 2005-069822

(51) Int. Cl.
*H01M 4/00* (2006.01)
(52) U.S. Cl. ............ 429/523; 429/498; 429/530; 429/531; 429/532
(58) Field of Classification Search ............ 429/40, 429/43, 44
See application file for complete search history.

(56) References Cited

U.S. PATENT DOCUMENTS 6,913,740 B2 * 7/2005 Polverejan et al. ....... 423/418.2
6,949,308 B2 * 9/2005 Gascoyne et al. ............ 429/42
2002/0177032 A1  11/2002 Suenaga et al.
2004/0121219 A1   6/2004 Mei et al.
2005/0238948 A1  10/2005 Mei et al.

FOREIGN PATENT DOCUMENTS

| JP | 2001-126738 | 5/2001 |
|---|---|---|
| JP | 2003-200052 | 7/2003 |
| JP | 2003-317742 | 11/2003 |

OTHER PUBLICATIONS

U.S. Appl. No. 12/542,090, filed Aug. 17, 2009, Song et al.

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, L.L.P.

(57) ABSTRACT

A cathode includes a diffusion layer, and a porous catalyst layer provided on the diffusion layer. The porous catalyst layer has a thickness not greater than 60 μm, a porosity of 30 to 70% and a pore diameter distribution including a peak in a range of 20 to 200 nm of a pore diameter. A volume of pores having a diameter of 20 to 200 nm is not less than 50% of a pore volume of the porous catalyst layer. The porous catalyst layer contains a supported catalyst comprising 10 to 30% by weight of a fibrous supported catalyst and 70 to 90% by weight of a granular supported catalyst. The fibrous supported catalyst includes a carbon nanofiber having a herringbone structure or a platelet structure. The granular supported catalyst includes a carbon black having 200 to 600 mL/100 g of a dibutyl phthalate (DBP) absorption value.

20 Claims, 1 Drawing Sheet

LIQUID FUEL CELL, MEMBRANE ELECTRODE ASSEMBLY AND CATHODE

CROSS-REFERENCE TO RELATED APPLICATIONS

This application is based upon and claims the benefit of priority from prior Japanese Patent Application No. 2005-069822, filed Mar. 11, 2005, the entire contents of which are incorporated herein by reference.

BACKGROUND OF THE INVENTION

1. Field of the Invention

The present invention relates to a cathode adapted for use in a liquid fuel type polymer electrolyte fuel cell, a membrane electrode assembly using the cathode, and a liquid fuel cell using the cathode.

2. Description of the Related Art

Fuel cells have attracted attention as a source of clean electric energy. A direct methanol fuel cell (DMFC) using a polymer electrolyte membrane permits miniaturization of the fuel cell, compared with other fuel cells. As a result, extensive research is being conducted on the direct methanol fuel cell as a power source for portable equipment such as a notebook-type personal computer or a cellular telephone.

The membrane electrode assembly of the DMFC using the polymer electrolyte membrane is a laminated structure constructed such that an anode diffusion layer, i.e., a so-called "current collector", an anode catalyst layer, i.e., a so-called "fuel electrode", a proton conductive membrane, a cathode catalyst layer, i.e., a so-called "oxidizing agent electrode" and a cathode diffusion layer, i.e., a so-called "current collector", are laminated one upon the other in the order mentioned. The catalyst layer is a mixed body comprising a catalytic activity substance, an electrically conductive substance, a proton conductive substance, and pores. In the case of a supported catalyst comprising an electrically conductive substance used as a carrier, the catalyst layer is in many cases a mixed body comprising the supported catalyst, the proton conductive substance, and pores.

If a mixed fuel having methanol and water is supplied into the anode catalyst layer, with the air (oxygen) being supplied to the cathode catalyst layer, catalytic reactions denoted by chemical formulas (1) and (2) given below are generated in the fuel electrode and the oxidizing agent electrode respectively:

Fuel Electrode:

$$CH_3OH + 2H_2O \rightarrow CO_2 + 6H^+ + 6e^- \quad (1)$$

Oxidizing Agent Electrode:

$$6H^+ + (3/2)O_2 + 6e^- \rightarrow 3H_2O \quad (2)$$

The protons generated in the fuel electrode migrate to the proton conductive membrane. On the other hand, the electrons migrate to the cathode diffusion layer. The electrons supplied from the cathode diffusion layer are allowed to react with the protons supplied from the proton conductive membrane and with oxygen, with the result that a current flows between a pair of current collectors. In order to obtain excellent fuel cell performance, it is desirable for the fuel electrode and the oxidizing agent electrode to satisfy the four requirements given below:

(A) An appropriate amount of fuel should be supplied to the fuel electrode.

(B) The catalytic reaction take place vigorously and promptly in the fuel electrode such that the reaction is carried out at triple phase boundaries of gas-catalyst-electrolyte.

(C) The electrons and the protons should migrate smoothly in both the fuel electrode and the oxidizing agent electrode.

(D) The reaction product should be discharged promptly from both the fuel electrode and the oxidizing agent electrode.

If the cathode is constructed to form an electrode structure that permits obtaining excellent fuel cell performance at low air feeding rates (low air performances), it is possible to miniaturize the DMFC. Therefore, it is desirable for the cathode to have a construction that permits promoting the air diffusion. The cathode that is most widely used nowadays is prepared by forming a slurry mixture such as a mixture containing granular catalysts and proton conductors together with a solvent on a carbon paper (cathode diffusion layer) or a proton conductive membrane by, for example, the coating method, a transfer method, or a spray method. However, the known cathode is incapable of obtaining sufficient fuel cell performance with a small air supply amount.

The cathode is very important in a polymer electrolyte membrane fuel cell (PEMFC) using a gaseous fuel such as a hydrogen gas. Such being the situation, extensive research is being conducted in an attempt to optimize the cathode structure. It is described in, for example, Japanese Patent Disclosure (Kokai) No. 2001-126738 that the electrode pore structure is optimized by changing the carrier. In the case of this patent document, it is proposed to introduce a fibrous carrier into the catalyst layer so as to optimize the electrode pore structure. It is also known in the art to suppress water flooding by the formation of an intermediate layer. However, compared with the study for the PEMFC, study of the optimization of the cathode of the DMFC is insufficient. In the DMFC, the so-called "cross-over" phenomenon is generated wherein the liquid fuel, e.g., a methanol aqueous solution, migrates through the electrolyte membrane to reach the cathode, though the cross-over phenomenon is quite small in the PEMFC using a hydrogen gas as a fuel. The cross-over phenomenon has a detrimental effect on the electrode catalytic reaction performed by the cathode. Also, it is more difficult to diffuse oxygen into the cathode of the DMFC than to diffuse oxygen into the cathode of the PEMFC. Various measures such as the optimization of the porosity and the pore diameter have been explored in order to optimize the cathode of the DMFC. For example, it is disclosed in Japanese Patent Disclosure No. 2003-317742 that carbon nanotubes are used for preparing a catalyst layer having high porosity. Also, it is disclosed in Japanese Patent Disclosure No. 2003-200052 that, in order to optimize the pore structure, fibers differing from each other in diameter distribution are mixed so as to form two different kinds of pore distribution, where the fine fibers are supported with the catalyst particles.

However, none of the proposals in the patent documents quoted above provides a sufficient measure. There seems to be room for further improvement in respect of the low air performance.

BRIEF SUMMARY OF THE INVENTION

An object of the present invention is to provide a cathode that permits obtaining excellent low air performance, a membrane electrode assembly using the cathode and a liquid fuel cell using the cathode.

According to a first aspect of the present invention, there is provided a liquid fuel cell comprising:

a cathode including a diffusion layer and a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value;

an anode; and a proton conductive membrane provided between the cathode and the anode.

According to a second aspect of the present invention, there is provided a membrane electrode assembly comprising:

a cathode including a diffusion layer and a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value;

an anode; and a proton conductive membrane provided between the cathode and the anode.

Further, according to a third aspect of the present invention, there is provided a cathode comprising:

a diffusion layer; and a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value.

DETAILED DESCRIPTION OF THE INVENTION

As a result of an extensive research on the optimization of the catalyst layer, the present inventors have found that the optimum pore structure is formed when the porous catalyst layer satisfies the conditions (1) to (7) given below:

(1) The thickness of the porous catalyst layer should be not greater than 60 μm;

(2) The porosity of the porous catalyst layer should fall within a range of 30 to 70%;

(3) The volume of pores having a diameter falling within a range of 20 to 200 nm should be not less than 50% of the total pore volume of the catalyst layer;

(4) The pore diameter distribution should have a peak in a range of 20 to 200 nm of the pore diameter;

(5) The catalyst layer should contain 10 to 30% by weight of a fibrous supported catalyst and 70 to 90% by weight of a granular supported catalyst;

(6) The fibrous supported catalyst should include a carbon nanofiber carrier having a herringbone structure or a platelet structure; and (7) The granular supported catalyst should include a carbon black granular carrier having 200 to 600 mL/100 g of a dibutyl phthalate (DBP) absorption value.

The cathode comprising the catalyst layer satisfying the conditions given above is excellent in improving air diffusion and suppressing the water flooding phenomenon and the cross-over phenomenon. Further, the cathode makes it possible to increase the supported amount of the catalyst per unit thickness of the catalyst layer and thus obtain excellent low air performance.

The polymer electrolyte fuel cell using a liquid fuel includes, for example, a direct methanol fuel cell (DMFC). The basic construction of a membrane electrode assembly of the DMFC will now be described with reference to FIG. 1.

Figure 1:
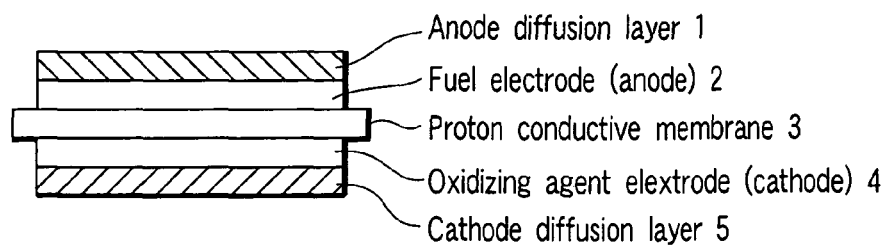
FIG. 1 is a cross-sectional view schematically showing the construction of a membrane electrode assembly for a polymer electrolyte fuel cell using a liquid fuel according to a first embodiment of the present invention.

As shown in FIG. 1, the membrane electrode assembly (fuel cell electromotive section) comprises an anode diffusion layer 1, an anode catalyst layer 2, a proton conductive membrane 3, a cathode catalyst layer 4 and a cathode diffusion layer 5, which are laminated one upon the other in the order mentioned.

It is possible to use a liquid fuel containing methanol. The liquid fuel containing methanol includes, for example, a methanol aqueous solution.

The cathode for the fuel cell according to the embodiment of the present invention will now be described.

In many cases, the catalyst layer as prepared differs in thickness from the catalyst layer during operation of the fuel cell. Therefore, the thickness of the catalyst layer is defined to denote the thickness of the catalyst layer after the hot press treatment applied for about 10 minutes to the cathode comprising the catalyst layer and the diffusion layer under the temperature of 125° C. and the pressure of 30 kg/cm$^2$.

In order to obtain excellent low air performance in the DMFC, it is necessary for the catalyst layer of the cathode to satisfy the conditions (1) to (4) given below:

(1) The thickness of the catalyst layer should be not greater than 60 μm;

(2) The porosity of the catalyst layer should fall within a range of 30 to 70%;

(3) The volume of the pores having a diameter falling within a range of 20 to 200 nm should be not less than 50% of the volume of the total pores formed in the catalyst layer; and (4) The pore diameter distribution should have a peak in a range of 20 to 200 nm of the pore diameter.

It is desirable for the pore diameter referred to in condition (3) given above to fall within a range of 40 to 200 nm. Also, it is desirable for the volume of the pores having a pore diameter falling within a range of 20 to 200 nm to be not less than 60% of the volume of the total pores formed in the catalyst layer. Incidentally, it is possible for the volume of the pores having a pore diameter falling within a range of 20 to 200 nm to be 100% relative to the volume of the total pores formed in the catalyst layer.

On the other hand, it is desirable for the pore diameter distribution to have a peak within the pore diameter range of 40 to 200 nm. Also, it is possible for the pore diameter distribution to have two peaks within the pore diameter range of 20 to 200 nm. Further, it is acceptable for the pore diameter distribution to have shoulders on both sides or one side of the peak.

The reasons why it is desirable for the conditions (1) to (4) given above to be satisfied by the catalyst layer of the cathode have not yet been clarified completely. However, it is considered reasonable to understand that it is most advantageous to satisfy these conditions in order to achieve the required air diffusion and the water flooding and to suppress the crossover of the fuel. If the thickness of the catalyst layer exceeds 60 μm and if the pore size distribution fails to satisfy any of the conditions (2) to (4), it is observed in many cases that the fuel cell performance are lowered at the low air feeding rate and it is difficult to obtain a high fuel cell output with a high stability. It is also considered reasonable to understand that, since the diffusion distance is excessively long or the pore diameter distribution is inappropriate, the air diffusion and the water discharge are not improved sufficiently so as to give rise to the difficulties pointed out above.

In order to facilitate the air diffusion and the water discharge, it is effective to decrease the thickness of the catalyst layer. However, in order to ensure a sufficiently large catalyst amount, it is desirable for the catalyst layer to have a thickness falling within a range of 20 to 60 μm.

It is possible to control appropriately the pore diameter distribution of the catalyst layer by allowing the catalyst layer defined to satisfy the conditions (1) to (4) given above to contain a fibrous supported catalyst and a granular supported catalyst so as to provide the optimum pore diameter distribution. It is desirable for the fibrous supported catalyst to include a carrier formed of nanofibers having an aspect ratio, i.e., ratio of the fiber length to the fiber diameter, not less than 10. The fibrous supported catalyst includes the catalyst particles supported by the carrier. On the other hand, it is desirable for the granular supported catalyst to include a carrier formed of a fine particle having an aspect ratio not greater than 2. The granular supported catalyst includes the catalyst particles supported by the fine granular carrier. The average diameter is defined to denote the average diameter of the primary particle. The carbon nanofibers are used as the carrier of the fibrous supported catalyst in view of the electric conductivity and the cost of the material. Also, the carbon black material, which is excellent in the electric conductivity and the durability, is used as the carrier of the granular supported catalyst. It should be noted, however, that it is considered possible to use a material other than carbon as the carrier of the supported catalyst.

The present inventors have found the diameters and the mixing ratios of two kinds of supported catalysts that permit forming the optimum pore diameter distribution. The present inventors have also found the DBP (dibutyl phthalate) absorption value of the granular carrier that is important for the chain structure (agglomeration structure) of the granular supported catalyst. To be more specific, a porous catalyst layer contains 10 to 30% by weight of a fibrous supported catalyst and 70 to 90% by weight of a granular supported catalyst. Carbon nanofibers having an average diameter of 50 to 400 nm, more preferably 80 to 300 nm, are used as a carrier for forming the fibrous supported catalyst. On the other hand, carbon black particles having an average diameter not greater than half the average diameter of the carbon nanofibers noted above and also having a dibutyl phthalate (DBP) absorption value of 200 to 600 mL/100 g are used as the carrier for forming the granular supported catalyst. It is possible for the thickness and the pore diameter distribution of the catalyst layer to satisfy the conditions (1) to (4) given previously by using the fibrous supported catalyst and the granular supported catalyst described above.

Further, it is desirable for the carbon nanofiber carrier to include 10 to 40% by weight of a first carbon nanofiber carrier having the herringbone structure or the platelet structure and having the average diameter of 50 to 100 nm and a second carbon nanofiber carrier having the herringbone structure or the platelet structure and also having the average diameter of 100 to 400 nm. It is more desirable for the average diameter of the second carbon nanofiber carrier to fall within a range of 100 to 300 nm.

It is possible to obtain excellent low air performance if the fibrous supported catalyst and the granular supported catalyst are further selected in addition to the pore structure. It is considered reasonable to understand that, in addition to the pore structure, the compatibility of the supported catalyst with the air, the water, the permeating fuel and the proton conductive substance contributes to the air diffusion, the water discharge and the electrode reaction, though the reasons for the effect produced by the compatibility of the supported catalyst noted above have not yet been clarified sufficiently. Various kinds of carbon nanofibers, which are classified depending on the manufacturing method, the structure and the surface state, have been reported to date. If classified depending on the structure, the carbon nanofibers are classified into a so-called "carbon nanotube structure" in which the C-plane of the constituting graphite crystals is oriented along the fiber length direction and into a so-called "herringbone structure" or the "platelet structure" in which the C-plane is oriented at an angle of 30 to 90° relative to the fiber length direction. It is desirable for the carbon nanofiber carrier used in the catalyst layer to have the herringbone structure or the platelet structure, and to have an average diameter of 50 to 400 nm and a specific surface area not less than 150 m$^2$/g. On the other hand, it is desirable for the granular carrier to have the DBP (dibutyl phthalate) absorption value of 200 to 600 mL/100 g, a specific surface area not less than 150 m$^2$/g, and an average diameter of 20 to 80 nm. It is considered reasonable to understand that the surface state of the carrier of this kind, e.g., the edge portions near the C-planes positioned on the side surface of the fibers, play an important role for producing a satisfactory catalytic function, or the catalyst are made more stable if the carrier satisfies the requirements referred to above, though the reasons therefor have not yet been clarified sufficiently.

It is desirable for the carbon nanofiber carrier and the granular carrier to have a specific surface area not less than 150 m$^2$/g. If the specific surface area is smaller than 150 m$^2$/g, the catalyst fine particles supported by the carrier tend to be agglomerated. Also, a problem tends to be generated in the stability of the long-term performance.

If the diameter and the construction of each of the fibrous supported catalyst and the granular supported catalyst are deviated from the ranges or the conditions given above, the fuel cell is unlikely to produce high outputs with a high stability. Also, the low air performance tend to be lowered. It is considered reasonable to understand that, if an appropriate pore diameter distribution is not obtained, the influence given by the cross-over is not suppressed sufficiently, the air diffusion and the water discharge are adversely affected, and the stability of the catalyst fine particles supported by the carrier is insufficient, thereby giving rise to the difficulties pointed out above.

It is desirable to use a Pt-containing catalyst such as a platinum metal catalyst as the catalyst material, though the catalyst material is not limited to the Pt-containing catalyst. The platinum metal catalyst includes Ru, Os, Rh, Ir, Pd, and Pt. In view of the density of the active sites and the stability of the catalyst, it is desirable to use catalyst fine particles having an average particle diameter of 2 to 5 nm. The supported catalyst can be manufactured by any of the solid phase reaction method, the solid phase-gaseous phase reaction method, the liquid phase method and the gaseous phase method. In the case of the liquid phase method, it is possible to employ any of the impregnation method, the precipitation method, the coprecipitation method, the colloid method and the ion exchanging method.

In order to obtain a catalyst layer having a thickness not greater than 60 μm, it is desirable for the catalyst contained in each of the fibrous supported catalyst and the granular supported catalyst to be supported by the carrier in an density not less than 30% by weight. Incidentally, the supporting density M (% by weight) of the catalyst is calculated by the formula given below:

$$M=\{W_1/(W_2+W_1)\}\times 100$$

where $W_1$ denotes the weight (g) of the catalyst, and $W_2$ denotes the weight (g) of the carrier.

Further, in order to realize high fuel cell performance, it is desirable for the ratio by weight of the proton conductive polymer to the carbon supported catalyst to fall within a range of 0.5 to 1. If the weight ratio noted above is smaller than 0.5, it is difficult to form a sufficient proton conduction path, resulting in failure to obtain high fuel cell performance. On the other hand, if the weight ratio in question exceeds 1, the catalyst particles are covered with the proton conductive polymer, with the result that the catalytic reaction or the electron path is inhibited by the proton conductive polymer, resulting in low fuel cell performance. The proton conductive polymer includes a fluorine-based resin having a sulfonic acid group such as NAFION (registered trade mark, manufactured by Dupont Inc.), though the proton conductive polymer is not limited to the fluorine-based resins having a sulfonic acid group. Any substance can be used as the proton conductive polymer, as far as the substance is capable of conducting the protons. In some cases, it is necessary to adjust the process in view of the compatibility of the proton conductive polymer with the catalyst layer.

In some cases, it is possible to further improve the fuel cell performance by further mixing another kind of a supported catalyst such as a catalyst supported by a conductive carrier such as nanohorns or nanotubes, or a non-supported catalyst.

The specific surface area and the pore volume of the carrier are measured by the BET method. Specifically, the construction, the aspect ratio and the average diameter of the carrier and the average diameter of the catalyst are measured by a transmission electron microscope (TEM) or by a high magnification FE-SEM electron microscope. The supporting density of the catalyst is determined by the chemical composition analysis. The DBP absorption value is measured by a DBP absorption method. For obtaining the pore diameter distribution of the cathode catalyst layer, the cathode consisting essentially of the catalyst layer and the diffusion layer is measured by the mercury porosimetry, and the pore diameter distribution of the cathode catalyst layer is calculated by excluding the pore diameter distribution of the diffusion layer from the pore diameter distribution of the cathode thus obtained. The amounts of the supported catalysts and the proton conductive polymer, which are contained in the catalyst layer, are obtained from the weight composition and the change in weight of the electrode during the process. Also, the total amount of the supported catalysts and the amount of the proton conductive polymer are confirmed by the chemical analysis.

The methods of manufacturing the cathode and the membrane electrode assembly (MEA) according to the embodiment of the present invention will now be described.

A wet method and a dry method can be employed for manufacturing the electrode. The following description is directed to a slurry method included in the wet method. Incidentally, the cathode can be manufactured by another electrode manufacturing method such as a transfer method.

In the first step, water is added to a supported catalyst, and the resultant aqueous system is stirred sufficiently, followed by adding a proton conductive solution and an organic solvent to the aqueous system noted above. Further, the resultant system is sufficiently stirred so as to disperse the supported catalyst in the system, thereby obtaining a slurry. Electrodes can be obtained by coating the above slurry on diffusion layers such as carbon papers or carbon clothes.

Both the cathode and the anode can be prepared by the method described above. A membrane electrode assembly is obtained by hot-pressing the cathode, a proton conductive membrane and the anode. It is desirable for the hot press to be performed under the temperature of 100 to 180° C., the pressure of 10 to 200 kg/cm$^2$ and the bonding time of 1 to 30 minutes.

Described in the following are Examples of the present invention. Needless to say, the technical scope of the present invention is not limited to the following Examples.

Example 1

Cathode

In the first step, weighed was 0.4 g of a fibrous supported catalyst (herein after referred to as "catalyst B") comprising a herringbone type cabon nanofiber carrier having an average diameter of 200 nm, a specific surface area of about 250 m$^2$/g, and an aspect ratio not less than 50 and Pt particles supported by the cabon nanofiber carrier in an amount of 50% by weight. Also weighed was 1.6 g of a granular supported catalyst (herein after referred to as "catalyst C") comprising a carbon black carrier having a primary particle diameter of about 40 nm, which is smaller than half the average diameter of the catalyst B, a specific surface area of about 800 m$^2$/g, and a DBP absorption value of 300 mL/100 g and Pt particles supported by the carbon black carrier in an amount of 50% by weight. The catalysts B and C thus prepared were mixed with 5 g of a pure water, 5 g of a 20% NAFION solution and 20 g of 2-ethoxy ethanol while stirring sufficiently the mixture, followed by dispersing the catalysts B and C in the mixture by using a desk top ball mill so as to prepare a slurry. Then, a carbon paper (350 μm, manufactured by Toray Inc.), which was subjected to the water repelling treatment in advance, was coated with the slurry thus obtained by using a control coater so as to obtain a cathode having 2 mg/cm² of the loading density of the noble metal catalyst.

<Anode>

In the first step, weighed was 3 g of a fibrous supported catalyst comprising a herringbone type cabon nanofiber carrier having an average diameter of 200 nm, a specific surface area of about 250 m²/g and an aspect ratio not less than 50 and $PtRu_{1.5}$ particles supported by the cabon nanofiber carrier in an amount of 40% by weight. Also weighed was 3 g of a granular supported catalyst comprising a carbon black carrier having a primary particle diameter of about 40 nm, a specific surface area of about 40 m²/g, and a DBP absorption value of 80 mL/100 g and $PtRu_{1.5}$ particles supported by the carbon black carrier in an amount of 40% by weight. These fibrous and granular supported catalysts were mixed with 8 g of a pure water, 15 g of a 20% NAFION solution, and 30 g of 2-ethoxy ethanol while stirring sufficiently the mixture, followed by dispersing these supported catalysts in the resultant system by using a desk top ball mill so as to obtain a slurry. Further, a carbon paper (350 μm, manufactured by Toray Inc.), which was subjected to the water repelling treatment in advance, was coated with the slurry thus obtained by using a control coater, so as to obtain an anode having 3 mg/cm² of the loading density of the noble metal catalyst.

<Preparation of Membrane Electrode Assembly>

Each of the cathode and the anode was cut into a square piece sized at 3.2×3.2 cm so as to have an electrode area of 10 cm². Then, a NAFION 117 membrane (registered trade mark, manufactured by Dupont Inc.), which was used as a proton conductive polymer electrolyte membrane, was interposed between the cathode and the anode, and hot press was applied to the resultant system for 10 minutes under the temperature of 125° C. and the pressure of 30 kg/cm² so as to obtain a membrane electrode assembly (MEA) constructed as shown in FIG. 1.

A unit cell of a direct methanol fuel cell (DMFC) was manufactured by using the membrane electrode assembly thus obtained and channel plates. The unit cell was maintained at 70° C., with 1 M of methanol aqueous solution supplied to the anode at a flow rate of 0.6 mL/min. and the air supplied to the cathode at a low flow rate of 80 mL/min., and was discharged at a current density of 150 mA/cm² so as to measure the cell voltage 50 hours later. Table 1 shows the result. The unit cell voltage at a current density of 150 mA/cm² under the conditions given above by using a methanol aqueous solution of 1.5 M was also measured. The voltage difference between the case using 1 M and the case using 1.5 M methanol aqueous solution was defined as the voltage drop shown in Table 1, to reveal a resistance to the cross-over.

Figure 2:
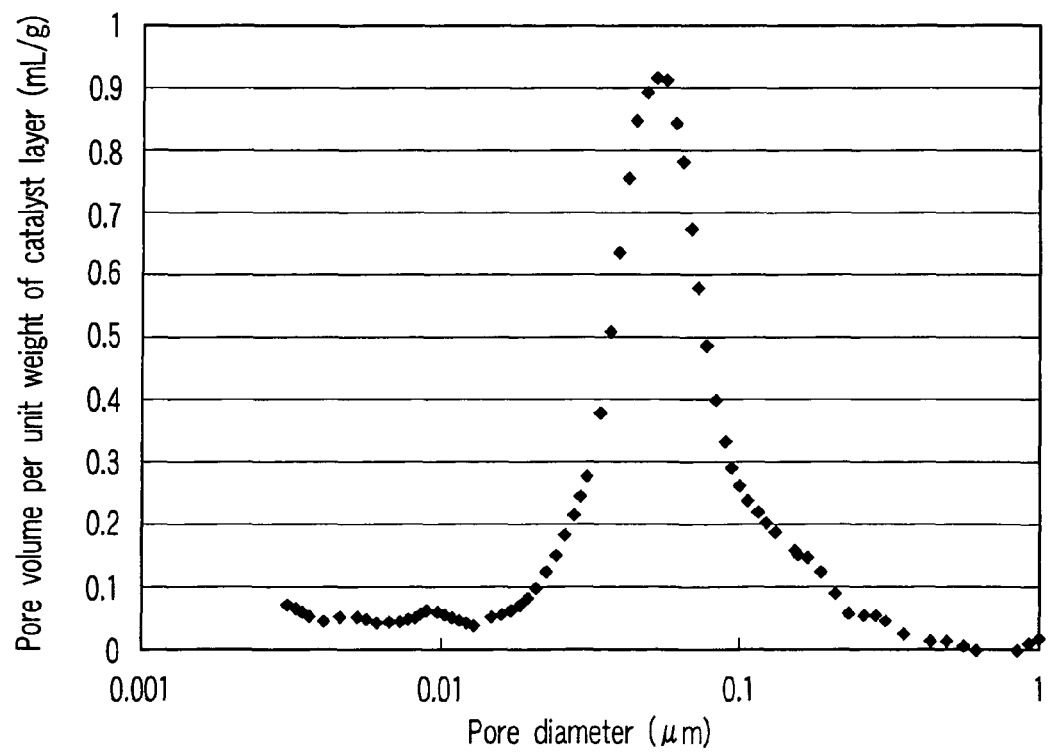
FIG. 2 is a graph showing the pore diameter distribution of the cathode for Example 1, as measured by the mercury porosimetry.

Also, in order to evaluate the pore structure of the cathode, a cathode consisting essentially of a carbon paper and a cathode catalyst layer formed on the carbon paper was manufactured by a method similar to that described above, and a thermocompression bonding was applied to the cathode thus manufactured for 10 minutes under the temperature of 125° C. and the pressure of 30 kg/cm² as in the manufacturing process of the MEA described above so as to measure the thickness and the weight of the cathode. Also, the pore diameter distribution was measured by the mercury porosimetry (Shimazu Auto Pore, type 9520). The weight, thickness and pore diameter distribution of the catalyst layer were obtained by subtracting those of the carbon paper from the weight, thickness and pore diameter distribution of the cathode including the carbon paper. The thickness of the catalyst layer was found to be 50 μm. Further, the porosity and the pore ratio (i.e., the ratio of the pores having a diameter range of 20 to 200 nm to the volume of the total pores) were obtained from the results of the measurement described above, with the results as shown in Table 1. FIG. 2 is a graph showing the pore diameter distribution of the cathode catalyst layer. From the experimental data given in FIG. 2, the porosity of the cathode catalyst layer was found to be 60%, and the volume of the pores having the diameter range of 20 to 20.0 nm was found to be 60% of the volume of the total pores.

Comparative Examples 1 and 2

In Comparative Example 1, a cathode was manufactured as in Example 1, except that 2 g of a fibrous supported catalyst similar to the fibrous supported catalyst B used in the cathode in Example 1 was used as a cathode catalyst. On the other hand, a cathode was manufactured in Comparative Example 2 as in Example 1, except that 2 g of a granular supported catalyst similar to the granular supported catalyst C used in the cathode in Example 1 was used as a cathode catalyst. A DMFC was manufactured as in Example 1 by using the cathode thus manufactured and the cathode was evaluated. Table 1 shows the results. As shown in Table 1, the voltage for each of Comparative Examples 1 and 2 at the low air feeding rate was found to be lower than that for Example 1. The low voltage for each of Comparative Examples 1 and 2 is considered to be derived from the pore diameter distribution in the catalyst layer as well as the thickness and construction of the catalyst layer in each of Comparative Examples 1 and 2.

Example 2

Weighed was 0.3 g of the fibrous supported catalyst B used in the cathode in Example 1. Also weighed was 0.1 g of a fibrous supported catalyst (hereinafter referred to as "catalyst A") comprising a herringbone type cabon nanofiber carrier having an average diameter of 80 nm, which is smaller than that for the catalyst B, a specific surface area of about 300 m²/g, and an aspect ratio not less than 50 and Pt fine particles supported by the carbon nanofiber carrier in an amount of 50% by weight. Further, weighed was 1.6 g of the granular supported catalyst C equal to that used in Example 1. The catalyst A corresponds to the first carbon nanofiber, and the fibrous supported catalyst B corresponds to the second carbon nanofiber. A cathode was manufactured as in Example 1 by using the supported catalysts A, B and C thus weighed. A DMFC was manufactured as in Example 1 by using the cathode thus manufactured and the cathode was evaluated, with the result as shown in Table 1. It can be understood that the fuel cell performance can be further improved at the low air feeding rate by adding the fine fibrous supported catalyst to the cathode.

Comparative Example 3

Used were supported catalysts similar to those used in Example 2. Also, a cathode was manufactured as in Example 2, except that the thickness of the catalyst layer of the cathode was set at 70 μm. Then, a DMFC was manufactured as in Example 1 by using the cathode thus obtained, and the cathode was evaluated, with the result as shown in Table 1. As apparent from the experimental data given in Table 1, the fuel cell performance were lowered, and the voltage drop was large under 1.5 M of the methanol concentration in the methanol aqueous solution when the thickness of the catalyst layer exceeded 60 μm.

Comparative Examples 4 and 5

Used were supported catalysts similar to those used in Example 2. A cathode was manufactured as in Example 2, except that the mixing amounts of the supported catalysts A to C differed from those in Example 2 as shown in Table 1. Then, a DMFC was manufactured as in Example 1 by using the cathode thus obtained, and the cathode was evaluated, with the result as shown in Table 1. It is defined in the present embodiment that the supported catalyst contains 10 to 30% by weight of the fibrous supported catalyst and 70 to 90% by weight of the granular supported catalyst, as described previously. If the mixing ratio of the fibrous supported catalyst and the granular supported catalyst fails to fall within the ranges defined in the present embodiment, the fuel cell performance are lowered at the low air feeding rate. As indicated by the result of the pore diameter ratio, the fuel cell performance are considered to be lowered at the low air feeding rate because the pore diameter distribution is inappropriate if the mixing ratio of the fibrous supported catalyst and the granular supported catalyst fail to fall within the ranges specified in the present embodiment.

Comparative Examples 6 to 8

The kind of the supported catalyst for the cathode was changed in each of Comparative Examples 6 to 8. To be more specific, in Comparative Example 6, a cathode was manufactured as in Example 1, except that the granular supported catalyst was changed into a granular supported catalyst comprising a carbon black carrier having a primary particle diameter of about 40 nm, a specific surface area of about 100 $m^2/g$, and a DBP absorption value of 80 mL/100 g and Pt catalyst particles supported by the carbon black carrier in an amount of 50% by weight. In Comparative Example 7, a cathode was manufactured as in Example 1, except that the fibrous supported catalyst B was changed into a fibrous supported catalyst comprising a carbon nanotube (CNT) carrier having a diameter of 30 nm, and a specific surface area of about 200 $m^2/g$, and Pt catalyst particles supported by the carbon nanotube carrier in an amount of 50% by weight. Further, in Comparative Example 8, a cathode was manufactured as in Example 1, except that the fibrous supported catalyst B was changed into a fibrous supported catalyst comprising a vapor phase crystal grown graphite fiber (VCGF carbon fiber) carrier having a diameter of 200 nm and a specific surface area of about 100 $m^2/g$ and Pt catalyst particles supported by the carrier in an amount of 50% by weight. A DMFC was manufactured as in Example 1 by using the cathode obtained in each of Comparative Examples 6 to 8, and the cathode was evaluated, with the results as shown in Table 1. As apparent from the experimental data, the fuel cell performance at the low air feeding rate for each of Comparative Examples 6 to 8 were lower than those for each of Examples 1 and 2. Also, the voltage drop under the methanol concentration of 1.5 M was large in each of Comparative Examples 6 to 8. The difficulties in each of Comparative Examples 6 to 8 are considered to have been caused by the situation that an appropriate pore structure was not formed in the catalyst layer of the cathode in each of Comparative Examples 6 to 8. In the case of Comparative Example 6, the factors other than the pore structure, e.g., the compatibility between the supported catalyst and the fuel and the stability of the catalyst, are supposed to have caused the difficulties noted above.

Example 3

Used was a supported catalyst for the cathode equal to that used in Example 2. Also, a cathode was manufactured as in Example 2, except that the thickness of the catalyst layer was set at 60 µm. Further, a DMFC was manufactured as in Example 1 by using the cathode thus obtained, and the cathode was evaluated, with the result as shown in Table 1. The comparison between the result of Example 3 and the result of Comparative Example 3 described previously indicates that, if the thickness of the catalyst layer is set at 60 µm or less, it is possible to improve the voltage performance at the low air feeding rate and the voltage drop under the methanol concentration of 1.5 M.

Examples 4 and 5

Used was a supported catalyst for the cathode equal to that used in Example 2. Then, a cathode having a porosity of 30% or 70% was manufactured as in Example 2, except that the supported catalysts A to C were mixed in the mixing ratio as shown in Table 1, which differed from that in Example 2. Further, a DMFC was manufactured as in Example 1 by using the cathode thus obtained, and the cathode was evaluated, with the result as shown in Table 1.

The comparison between the result of Examples 4 and 5 and the result of Comparative Examples 1 and 2 described previously indicates that it is possible to improve the voltage performance at low air feeding rate and to improve the voltage drop under the methanol concentration of 1.5 M, if the porosity of the catalyst layer falls within a range of 30 to 70%.

Example 6

Used was a supported catalyst for the cathode equal to that used in Example 2. Then, a cathode was manufactured as in Example 2, except that the supported catalysts A to C were mixed in the mixing ratio as shown in Table 1. The pores having a diameter of 20 to 200 nm were formed in the catalyst layer in an amount of 50% by volume of all the pores of the catalyst layer. Further, a DMFC was manufactured as in Example 1 by using the cathode thus obtained, and the cathode was evaluated, with the result as shown in Table 1.

The experimental data for Example 6 indicates that it is possible to improve the voltage performance at low air feeding rate and to improve the voltage drop under the methanol concentration of 1.5 M, if the pores having a pore diameter of 20 to 200 nm are formed in the catalyst layer in an amount of 50% by volume or more of all the pores formed in the catalyst layer.

Examples 7 and 8

Used was a supported catalyst for the cathode equal to that used in Example 2. Then, a cathode was manufactured as in Example 2, except that the supported catalysts A to C were mixed in the mixing ratio as shown in Table 1, which differed from that in Example 2. Further, a DMFC was manufactured as in Example 1 by using the cathode thus obtained, and the cathode was evaluated, with the result as shown in Table 1.

The comparison between the result of Examples 7 and 8 and the result of Comparative Examples 4 and 5 indicates that it is possible to improve the voltage performance at low air feeding rate and to improve the voltage drop under the methanol concentration of 1.5 M, if the mixing amount of the fibrous supported catalyst is set to fall within a range of 10 to 30% by weight and the mixing amount of the granular supported catalyst is set to fall within a range of 70 to 90% by weight.

Example 9

A cathode was manufactured as in Example 1, except that used was the supported catalyst C formed of a granular supported catalyst comprising a carbon black carrier having a primary particle diameter of about 45 nm, a specific surface area of about 200 m²/g and a DBP absorption value of 200 mL/100 g and Pt catalyst particles supported by the carbon black carrier in an amount of 50% by weight. A DMFC was manufactured as in Example 1 by using the cathode thus obtained, and the cathode was evaluated, with the result as shown in Table 1.

Example 10

A cathode was manufactured as in Example 1, except that used was the supported catalyst C formed of a granular supported catalyst comprising a carbon black carrier having a primary particle diameter of about 40 nm, a specific surface area of about 600 m²/g and a DBP absorption value of 600 mL/100 g and Pt catalyst particles supported by the carbon black carrier in an amount of 50% by weight. A DMFC was manufactured as in Example 1 by using the cathode thus obtained, and the cathode was evaluated, with the result as shown in Table 1.

carrier having an average diameter of 150 nm, a specific surface area of about 250 m²/g and an aspect ratio not less than 10 and Pt fine particles supported by the cabon nanofiber carrier in an amount of 50% by weight and a supported catalyst A consisting of a fibrous supported catalyst comprising a platelet type cabon nanofiber carrier having an average diameter of 50 nm, a specific surface area of about 300 m²/g and an aspect ratio not less than 10 and Pt fine particles supported by the cabon nanofiber carrier in an amount of 50% by weight. Then, a DMFC was manufactured as in Example 1 by using the cathode thus obtained, and the cathode was evaluated, with the result as shown in Table 1.

The experimental data for Example 11 indicates that it is possible to improve the voltage performance at low air feeding rate and to improve the voltage drop under the methanol concentration of 1.5 M, even if a platelet type cabon nanofiber carrier is used in place of the herringbone type cabon nanofiber carrier.

TABLE 1

| | Construction (g) catalyst A/ catalyst B/ catalyst C (% by weight) | Mixing ratio of fibrous supported catalyst (% by weight) | Thickness of catalyst layer (μm) | Porosity of catalyst layer (% by volume) | Pore ratio of 20–200 nm (% by volume) | Diameter at peak value (nm) | Voltage at low air feeding rate (V) | Voltage drop under 1.5 M (V) |
|---|---|---|---|---|---|---|---|---|
| Example 1 | 0/20/80 | — | 50 | 60 | 60 | 60 | 0.500 | 0.02 |
| Comparative Example 1 | 0/100/0 | — | 75 | 75 | 15 | 600 | 0.460 | 0.03 |
| Comparative Example 2 | 0/0/100 | — | 30 | 25 | 80 | 50 | 0.470 | 0.02 |
| Example 2 | 5/15/80 | A:B = 25:75 | 45 | 55 | 65 | 55 | 0.510 | 0.02 |
| Comparative Example 3 | 5/15/80 | A:B = 25:75 | 70 | 60 | 35 | 60 | 0.480 | 0.03 |
| Comparative Example 4 | 10/40/50 | A:B = 20:80 | 60 | 65 | 10 | 80 | 0.470 | 0.03 |
| Comparative Example 5 | 0.5/7/92.5 | A:B = 6.7:93.3 | 40 | 45 | 60 | 30 | 0.485 | 0.03 |
| Comparative Example 6 | 5/15/80 | A:B = 25:75 | 40 | 45 | 10 | 70 | 0.450 | 0.04 |
| Comparative Example 7 | 20/0/80 | — | 40 | 45 | 80 | 40 | 0.470 | 0.05 |
| Comparative Example 8 | 0/20/80 | — | 50 | 65 | 30 | 60 | 0.450 | 0.04 |
| Example 3 | 5/15/80 | A:B = 25:75 | 60 | 60 | 65 | 55 | 0.500 | 0.02 |
| Example 4 | 10/0/90 | A:B = 100:0 | 40 | 30 | 70 | 50 | 0.490 | 0.02 |
| Example 5 | 3/12/85 | A:B = 20:80 | 55 | 70 | 55 | 65 | 0.490 | 0.02 |
| Example 6 | 0/15/85 | A:B = 0:100 | 55 | 65 | 50 | 65 | 0.490 | 0.02 |
| Example 7 | 5/5/90 | A:B = 50:50 | 40 | 50 | 65 | 50 | 0.490 | 0.02 |
| Example 8 | 15/15/70 | A:B = 50:50 | 60 | 70 | 55 | 55 | 0.495 | 0.02 |
| Example 9 | 0/20/80 | A:B = 0:100 | 45 | 55 | 60 | 60 | 0.495 | 0.02 |
| Example 10 | 0/20/80 | A:B = 0:100 | 60 | 70 | 80 | 70 | 0.495 | 0.02 |
| Example 11 | 10/10/80 | A:B = 50:50 | 50 | 60 | 60 | 55 | 0.495 | 0.02 |

The comparison between the result of Examples 9, 10 and the result of Comparative Example 6 indicates that it is possible to improve the voltage performance at low air feeding rate and to improve the voltage drop under the methanol concentration of 1.5 M, if the DBP absorption amount of the carbon black carrier falls within a range of 200 mL/100 g to 600 mL/100 g.

Example 11

A cathode was manufactured as in Example 2, except that used were a supported catalyst B consisting of a fibrous supported catalyst comprising a platelet type cabon nanofiber The experimental data given above clearly support the effect produced by the embodiment of the present invention on the improvement of the catalyst layer and on the improvement of the output of the fuel cell.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid fuel cell comprising:
a cathode including a diffusion layer and a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value;
an anode; and
a proton conductive membrane provided between the cathode and the anode.

2. The liquid fuel cell according to claim 1, wherein the carbon nanofiber has an average diameter of 50 to 400 nm, and the carbon black has an average diameter of not greater than half the average diameter of the carbon nanofiber.

3. The liquid fuel cell according to claim 2, wherein the average diameter of the carbon nanofiber falls within a range of 80 to 300 nm.

4. The liquid fuel cell according to claim 2, wherein the average diameter of the carbon black falls within a range of 20 to 80 nm.

5. The liquid fuel cell according to claim 1, wherein each of the carbon nanofiber and the carbon black has a specific surface area not less than 150 m$^2$/g.

6. The liquid fuel cell according to claim 1, wherein the carbon nanofiber comprises:
10 to 40% by weight of a first carbon nanofiber having a herringbone structure or a platelet structure and having an average diameter of 50 to 100 nm; and
60 to 90% by weight of a second carbon nanofiber having a herringbone structure or a platelet structure and having an average diameter of 100 to 400 nm, and the average diameter of the first carbon nanofiber being smaller than the average diameter of the second carbon nanofiber.

7. The liquid fuel cell according to claim 1, wherein the porous catalyst layer has a thickness of 20 to 60 μm.

8. The liquid fuel cell according to claim 1, wherein a volume of pores having a diameter of 40 to 200 nm is not less than 50% of a pore volume of the porous catalyst layer.

9. The liquid fuel cell according to claim 1, wherein a volume of pores having a diameter of 20 to 200 nm is not less than 60% of a pore volume of the porous catalyst layer.

10. The liquid fuel cell according to claim 1, wherein the pore diameter distribution has a peak in a range of 40 to 200 nm of the pore diameter.

11. The liquid fuel cell according to claim 1, which comprises a liquid fuel containing methanol.

12. A membrane electrode assembly comprising:
a cathode including a diffusion layer and a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value;
an anode; and
a proton conductive membrane provided between the cathode and the anode.

13. The membrane electrode assembly according to claim 12, wherein the carbon nanofiber has an average diameter of 50 to 400 nm, and the carbon black has an average diameter of not greater than half the average diameter of the carbon nanofiber.

14. The membrane electrode assembly according to claim 12, wherein each of the carbon nanofiber and the carbon black has a specific surface area not less than 150 m$^2$/g.

15. The membrane electrode assembly according to claim 12, wherein the carbon nanofiber comprises:
10 to 40% by weight of a first carbon nanofiber having a herringbone structure or a platelet structure and having an average diameter of 50 to 100 nm; and
60 to 90% by weight of a second carbon nanofiber having a herringbone structure or a platelet structure and having an average diameter of 100 to 400 nm, and the average diameter of the first carbon nanofiber being smaller than the average diameter of the second carbon nanofiber.

16. The membrane electrode assembly according to claim 12, wherein a volume of pores having a diameter of 40 to 200 nm is not less than 50% of a pore volume of the porous catalyst layer.

17. The membrane electrode assembly according to claim 12, wherein a volume of pores having a diameter of 20 to 200 nm is not less than 60% of a pore volume of the porous catalyst layer.

18. The membrane electrode assembly according to claim 12, wherein the pore diameter distribution has a peak in a range of 40 to 200 nm of the pore diameter.

19. A cathode comprising:
a diffusion layer; and
a porous catalyst layer provided on the diffusion layer, the porous catalyst layer having a thickness not greater than 60 μm, a porosity of 30 to 70% and a pore diameter distribution including a peak in a range of 20 to 200 nm of a pore diameter, a volume of pores having a diameter of 20 to 200 nm being not less than 50% of a pore volume of the porous catalyst layer, the porous catalyst layer containing a supported catalyst which comprises 10 to 30% by weight of a fibrous supported catalyst and 70 to 90% by weight of a granular supported catalyst, the fibrous supported catalyst including a carbon nanofiber having a herringbone structure or a platelet structure, and the granular supported catalyst including a carbon black having 200 to 600 mL/100 g of a dibutyl phthalate (DBP) absorption value.

20. The cathode according to claim 19, wherein the carbon nanofiber has an average diameter of 50 to 400 nm, and the carbon black has an average diameter of not greater than half the average diameter of the carbon nanofiber.

* * * * *